(12) United States Patent
Dellock et al.

(10) Patent No.: US 11,787,482 B1
(45) Date of Patent: Oct. 17, 2023

(54) VEHICLE ROCK RAILS WITH ENERGY ABSORBING STRUCTURES AND ASSOCIATED METHODS FOR MANUFACTURE

(71) Applicant: FORD GLOBAL TECHNOLOGIES, LLC, Dearborn, MI (US)

(72) Inventors: Paul Kenneth Dellock, Northville, MI (US); David Brian Glickman, Southfield, MI (US); Stuart C Salter, White Lake, MI (US); Patrick Reed, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 37 days.

(21) Appl. No.: 17/739,449

(22) Filed: May 9, 2022

(51) Int. Cl.
*B62D 25/00* (2006.01)
*B60R 3/00* (2006.01)
*B62D 25/20* (2006.01)

(52) U.S. Cl.
CPC .......... *B62D 25/2072* (2013.01); *B60R 3/002* (2013.01)

(58) Field of Classification Search
CPC ....... B60R 3/002; B60R 19/42; B62D 21/155; B62D 25/025; B62D 25/2072
USPC ........................................ 296/204, 205, 209
See application file for complete search history.

(56) References Cited

U.S. PATENT DOCUMENTS

| | | | | |
|---|---|---|---|---|
| 4,935,638 | A * | 6/1990 | Straka | B60R 19/42 297/75 |
| 4,943,085 | A * | 7/1990 | Straka | B60R 3/00 280/169 |
| 8,016,309 | B2 * | 9/2011 | Flajnik | B60R 3/002 280/169 |
| 10,894,513 | B2 | 1/2021 | Dellock et al. | |
| 11,083,051 | B2 | 8/2021 | Dellock et al. | |
| 2003/0006575 | A1 * | 1/2003 | Genis | B60R 19/42 280/163 |
| 2016/0059811 | A1 * | 3/2016 | Vermeys | B60R 19/42 293/128 |
| 2020/0031287 | A1 * | 1/2020 | Stanesic | G06T 1/60 |
| 2020/0130762 | A1 | 8/2020 | Crandall | |
| 2022/0306002 | A1 * | 9/2022 | Chung | B60R 3/002 |

FOREIGN PATENT DOCUMENTS

JP 5109315 B2 12/2012

* cited by examiner

*Primary Examiner* — Jason S Daniels
(74) *Attorney, Agent, or Firm* — Vichit Chea; Carlson, Gaskey & Olds, P.C.

(57) ABSTRACT

Rock rail assemblies are provided for motor vehicles. An exemplary rock rail assembly may include a beam structure, an energy absorbing structure, and an outer skin. The energy absorbing structure may reinforce the beam structure and may be configured to distribute point loads when an obstacle impinges upon the rock rail assembly. The beam structure may be made of a metallic material, the energy absorbing structure may be made of a foamed polymer-based material, and the outer skin may be made of a polymer-based material. The rock rail assemblies may be constructed in a manufacturing method that involves roll forming and extrusion processes.

20 Claims, 3 Drawing Sheets

VEHICLE ROCK RAILS WITH ENERGY ABSORBING STRUCTURES AND ASSOCIATED METHODS FOR MANUFACTURE

TECHNICAL FIELD

This disclosure relates generally to motor vehicles, and more particularly to vehicle rock rail assemblies that include energy absorbing structures.

BACKGROUND

Some motor vehicles, particularly those equipped for off-roading, may include rock rails. The rock rails are configured to shield portions of a frame or body of the vehicle when traversing over rocks, boulders, stumps, or other obstacles associated with a given terrain.

SUMMARY

A rock rail assembly for a motor vehicle according to an exemplary aspect of the present disclosure includes, among other things, a beam structure, an energy absorbing structure secured to the beam structure to establish a reinforced subassembly of the rock rail assembly, and an outer skin formed about the reinforced subassembly.

In a further non-limiting embodiment of the foregoing rock rail assembly, the energy absorbing structure is secured to a bottom surface of the beam structure.

In a further non-limiting embodiment of either of the foregoing rock rail assemblies, the beam structure is a steel beam.

In a further non-non-limiting embodiment of any of the foregoing rock rail assemblies, the steel beam includes a box-like structure and a weld seam.

In a further non-non-limiting embodiment of any of the foregoing rock rail assemblies, the energy absorbing structure is comprised of a foamed polymer-based material.

In a further non-non-limiting embodiment of any of the foregoing rock rail assemblies, the foamed polymer-based material includes a high density polyethylene (HDPE) that is modified by a foaming agent.

In a further non-non-limiting embodiment of any of the foregoing rock rail assemblies, the foamed polymer-based material includes an adhesive resin.

In a further non-non-limiting embodiment of any of the foregoing rock rail assemblies, the outer skin encapsulates the reinforced subassembly.

In a further non-non-limiting embodiment of any of the foregoing rock rail assemblies, the outer skin includes a polymer-based material.

In a further non-non-limiting embodiment of any of the foregoing rock rail assemblies, the polymer-based material includes a high density polyethylene (HDPE).

In a further non-non-limiting embodiment of any of the foregoing rock rail assemblies, the polymer-based material includes an adhesive resin.

In a further non-non-limiting embodiment of any of the foregoing rock rail assemblies, at least one opening is formed in the beam structure. The at least one opening is configured for receiving a mechanical fastener.

A motor vehicle according to another exemplary aspect of the present disclosure includes, among other things, a vehicle body structure, and a rock rail assembly mounted to the vehicle body structure. The rock rail assembly includes a beam structure, an energy absorbing structure secured to the beam structure to establish a reinforced subassembly, and an outer skin formed around the reinforced subassembly.

In a further non-limiting embodiment of the foregoing motor vehicle, the beam structure is made of a metallic material, the energy absorbing structure is made of a foamed polymer-based material, and the outer skin is made of a polymer-based material.

In a further non-limiting embodiment of either of the foregoing motor vehicles, the foamed polymer-based material includes a high density polyethylene (HDPE) that is modified by a foaming agent.

In a further non-limiting embodiment of any of the forgoing motor vehicles, the metallic material includes steel.

In a further non-limiting embodiment of any of the forgoing motor vehicles, the polymer-based material includes a high density polyethylene (HDPE) that is modified by an adhesive resin.

In a further non-limiting embodiment of any of the forgoing motor vehicles, at least one opening is formed in the beam structure. A mechanical fastener is received through the vehicle body structure and the at least one opening.

In a further non-limiting embodiment of any of the forgoing motor vehicles, the mechanical fastener attaches to a U-nut within an interior area of the beam structure.

A method for manufacturing a rock rail assembly for a motor vehicle according to another exemplary aspect of the present disclosure includes, among other things, roll forming a beam structure, extruding an energy absorbing structure onto the beam structure to form a reinforced subassembly of the rock rail assembly, and extruding an outer skin about the reinforced subassembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details rock rail assemblies for motor vehicles. An exemplary rock rail assembly may include a beam structure, an energy absorbing structure, and an outer skin. The energy absorbing structure may reinforce the beam structure and may be configured to distribute point loads when an obstacle impinges upon the rock rail assembly. The beam structure may be made of a metallic material, the energy absorbing structure may be made of a foamed polymer-based material, and the outer skin may be made of a polymer-based material. The rock rail assemblies may be constructed in a manufacturing method that involves roll forming and extrusion processes. These and other features of this disclosure are described in greater detail in the following paragraphs of this detailed description.

Figure 1:
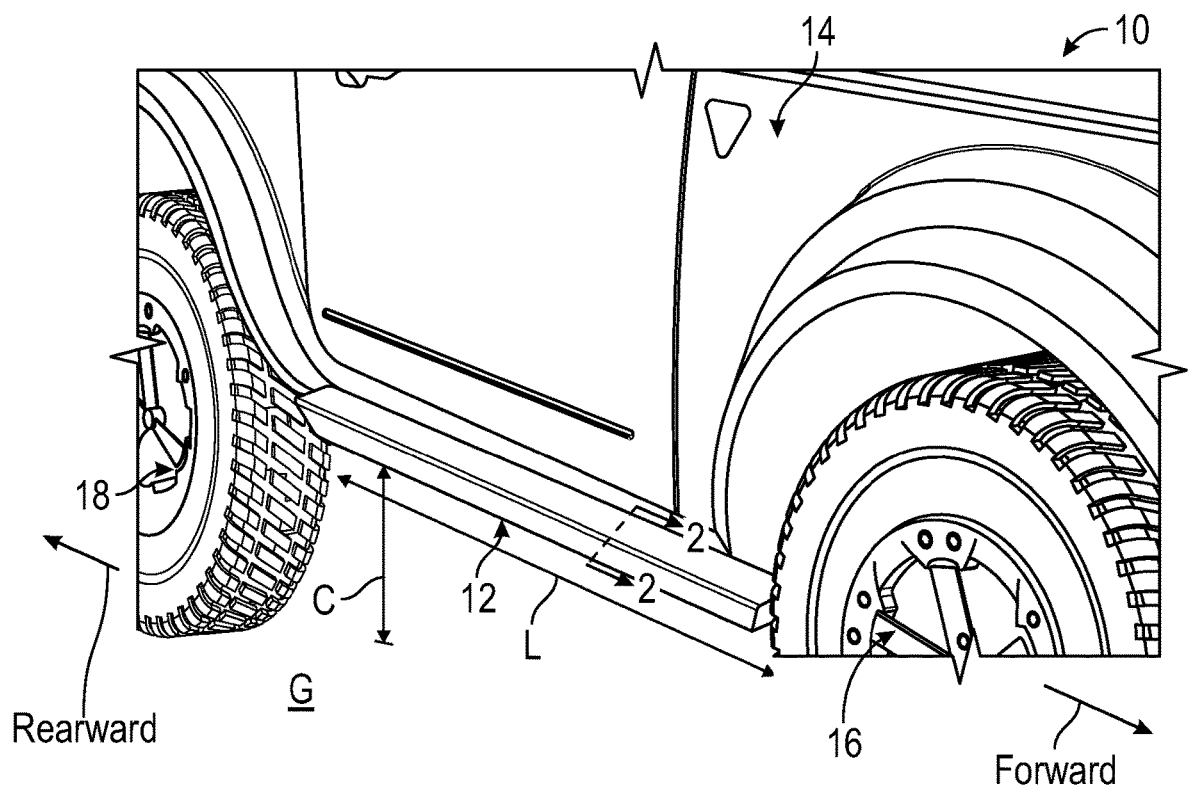
FIG. 1 illustrates a motor vehicle equipped with a rock rail assembly.

FIG. 1 schematically illustrates select portions of a motor vehicle 10. The vehicle 10 may be a pickup truck, a sport utility vehicle (SUV), a van, or any other type of vehicle having a relatively high clearance C between a floor of the vehicle and a ground surface G. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may include a rock rail assembly 12. The rock rail assembly 12 may sometimes be referred to a rock slider assembly. "Rock rail" and "rock slider" should therefore be understood to be synonymous terms for the purposes of this disclosure.

The rock rail assembly 12 may be mounted relative to a vehicle body 14, which may include portions of both a frame and a paneling of the vehicle 10. The rock rail assembly 12 extends along a length L that is parallel to the "forward" and "rearward" directions, which are labeled in FIG. 1 and correspond to the normal "forward" and "rearward" orientations of the vehicle 10. In an embodiment, the length L of the rock rail assembly 12 spans a majority of a distance between a front wheel 16 and a rear wheel 18 of the vehicle 10. However, the size of the rock rail assembly 12 is not intended to limit this disclosure. Moreover, while only one rock rail assembly 12 is shown in FIG. 1, it should be understood that a similar rock rail assembly may be provided on an opposite side of the vehicle 10.

The rock rail assembly 12 may provide various vehicle-related functions. For example, the rock rail assembly 12 may be configured to shield underbody portions and/or side portions of the vehicle body 14, such as when the vehicle 10 is traversing over rocks, boulders, stumps, or other obstacles. The rock rail assembly 12 may be further configured to distribute point loads when an obstacle impinges upon the rock rail assembly 12 during vehicle operation. The rock rail assembly 12 may further provide one or more step surfaces for assisting a user when attempting to enter or exit the vehicle 10.

Figure 2:
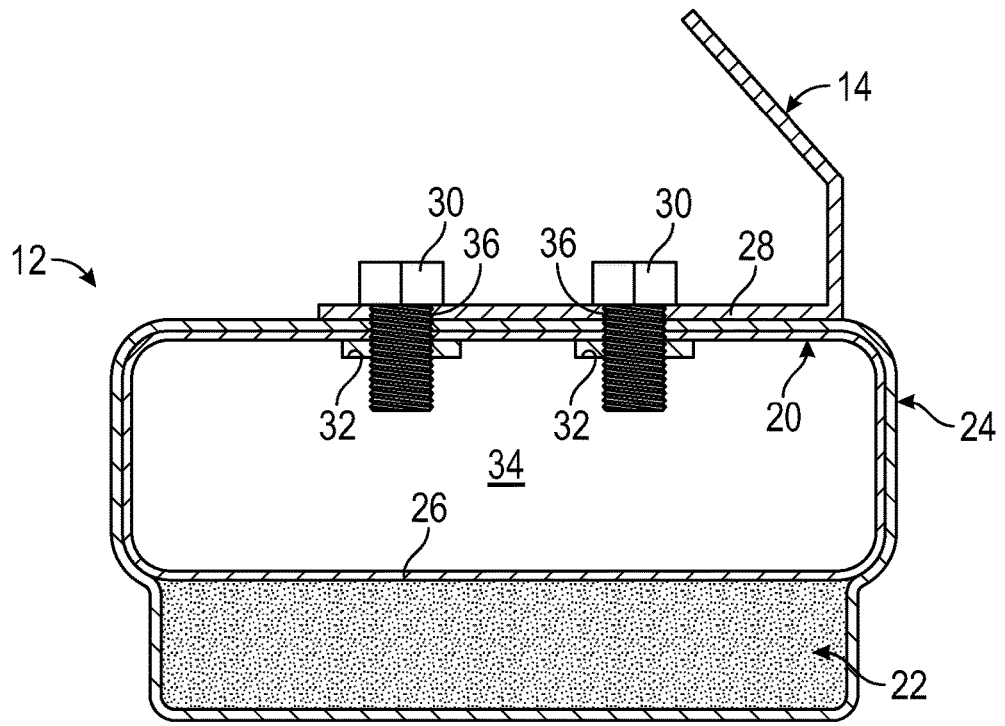
FIG. 2 is a cross-sectional view through section 2-2 of the rock rail assembly of FIG. 1.

FIG. 2 illustrates an exemplary design of the rock rail assembly 12 of FIG. 1. The rock rail assembly 12 may include a beam structure 20, an energy absorbing structure 22, and an outer skin 24. Each of these respective structures is further detailed below.

The beam structure 20 may be made of a metallic material. In an embodiment, the beam structure 20 is a steel beam. In another embodiment, the beam structure 20 is rectangular-shaped or box-shaped. However, other metallic materials and/or other shapes are further contemplated as being within the scope of this disclosure.

The energy absorbing structure 22 may be formed on (e.g., extruded onto) a bottom surface 26 of the beam structure 20. The energy absorbing structure 22 may extend along an entire length of the bottom surface 26, and thus the two structures may be substantially equivalent in length. The energy absorbing structure 22 may structurally reinforce the beam structure 20 and may be configured to distribute point loads across a relatively larger surface area, such as when an obstacle impinges upon the rock rail assembly 12, for example.

The energy absorbing structure 22 may be made of a foamed polymer-based material. A material composition of the energy absorbing structure 22 may therefore include an extrusion grade high density polyethylene (HDPE) that is modified by a foaming agent. The foaming agent may be a chemical foaming agent designed for extrusion applications. An exemplary foaming agent is Foamazol™ 31, sold by Bergen International. However, other suitable foaming agents could alternatively be employed as part of the material make-up of the energy absorbing structure 22 within the scope of this disclosure.

The material composition of the energy absorbing structure 22 may further include an adhesive resin that helps bond the energy absorbing structure 22 to the beam structure 20. An exemplary adhesive resin is sold by Mitsui Chemicals under the trade name ADMER™ NEO72E, which includes a modified polypropylene-base with anhydride group. The material composition of the energy absorbing structure 22 may further include additives such as an antioxidant and a color additive.

An exemplary material composition of the energy absorbing structure 22 may include about 87% HDPE, about 1% foaming agent, about 10% adhesive resin, about 0.25% antioxidant, and about 1% color additive, with each substituent component defined as a percentage by weight relative to the total weight of the formulation. However, other formulations are contemplated within the scope of this disclosure.

In this disclosure, the term "about" means that the expressed quantities or ranges need not be exact but may be approximated and/or larger or smaller, reflecting acceptable tolerances, conversion factors, measurement error, etc.

The outer skin 24 may be formed about (e.g., extruded around) a subassembly established by the beam structure 20 and the energy absorbing structure 22. The outer skin 24 may therefore substantially encapsulate the subassembly formed by the beam structure 20 and the energy absorbing structure 22, thereby forming a more elastically pleasing OEM level Class-A surface of the rock rail assembly 12.

The outer skin 24 may be made of a polymer-based material. A material composition of the outer skin 24 may include an extrusion grade high density polyethylene (HDPE). The material composition of the outer skin 24 may further include an adhesive resin that helps bond the outer skin 24 to the beam structure 20. An exemplary adhesive resin is ADMER™ NEO72E. The material composition of the outer skin 24 could further include additives such as a UV stabilizer, an antioxidant, and a color additive.

An exemplary material composition of the outer skin 24 may include about 87% HDPE, about 10% adhesive resin, about 1% UV stabilizer, about 0.25% antioxidant, and about 1% color additive, with each substituent component defined as a percentage by weight relative to the total weight of the formulation. However, other formulations are contemplated within the scope of this disclosure.

The rock rail assembly 12 may be secured to a structure 28 of the vehicle body 14. The structure 28 could be a bracket, a frame member, a paneling, or any other structure associated with the vehicle body 14.

A plurality of mechanical fasteners 30 may be utilized to secure the rock rail assembly 12 to the structure 28. The mechanical fasteners 30 may be bolts that attach to U-nuts 32 within an interior area 34 of the beam structure 20. The mechanical fasteners 30 may extend through openings 36 formed through the outer skin 24 and the beam structure 20 to engage the U-nuts 32. Notably, in the exemplary embodiment, the mechanical fasteners 30 do not extend through the energy absorbing structure 22.

Figure 3:
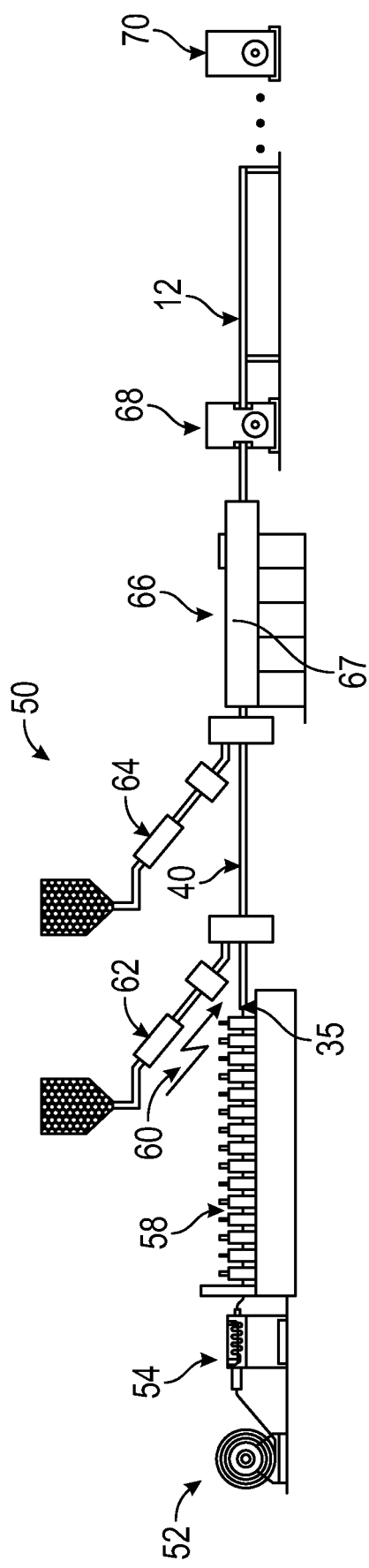
FIG. 3 schematically illustrates manufacturing stations that may be used to manufacture the rock rail assembly of FIGS. 1-2.
Figure 4:
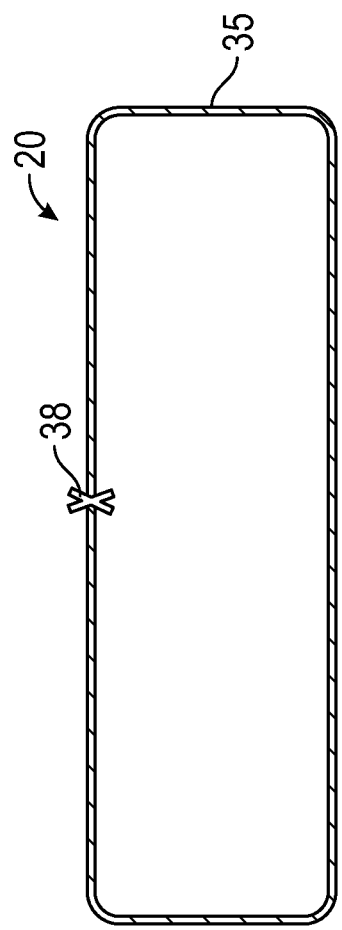
FIG. 4 illustrates a beam structure of a rock rail assembly.

FIG. 3, with continued reference to FIGS. 1 and 2, schematically illustrates a method 50 for manufacturing the rock rail assembly 12 described above. The stages of the method 50 may include an unrolling stage 52 where a sheet of material is unrolled from a roll. The material may then pass through a flattening stage 54 and then through a roll forming stage 58 to provide a box-like structure having a desired cross-sectional profile. The box-like structure may then be welded at a seam welding stage 60 to form the beam structure 20. An exemplary beam structure 20 having a box structure 35 and a weld seam 38 is shown in FIG. 4.

Figure 5:
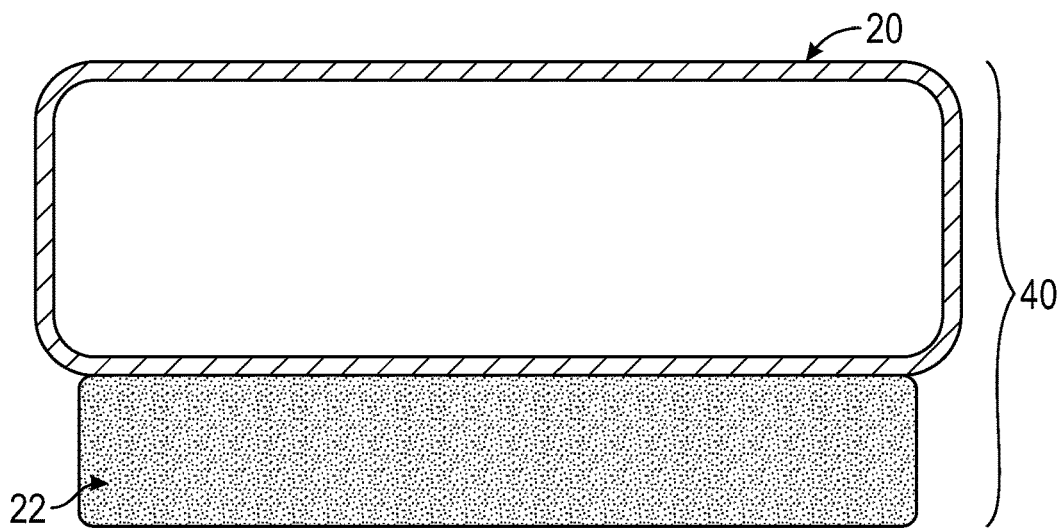
FIG. 5 illustrates a reinforced subassembly of a rock rail assembly.

Next, at a first extrusion stage 62, a cross-head extruder may extrude the energy absorbing structure 22 onto the bottom surface 26 of the beam structure 20, thereby forming a reinforced subassembly 40 (see FIG. 5) of the rock rail assembly 12. The reinforced subassembly 40 may then pass through a second extrusion stage 64 where a cross-head extruder may extrude the outer skin 24 around the reinforced subassembly 40. The reinforced subassembly 40 is not fully cooled when the outer skin 24 is extruded about the reinforced subassembly 40. The method 50 can thus be considered a co-extrusion process.

Figure 6:
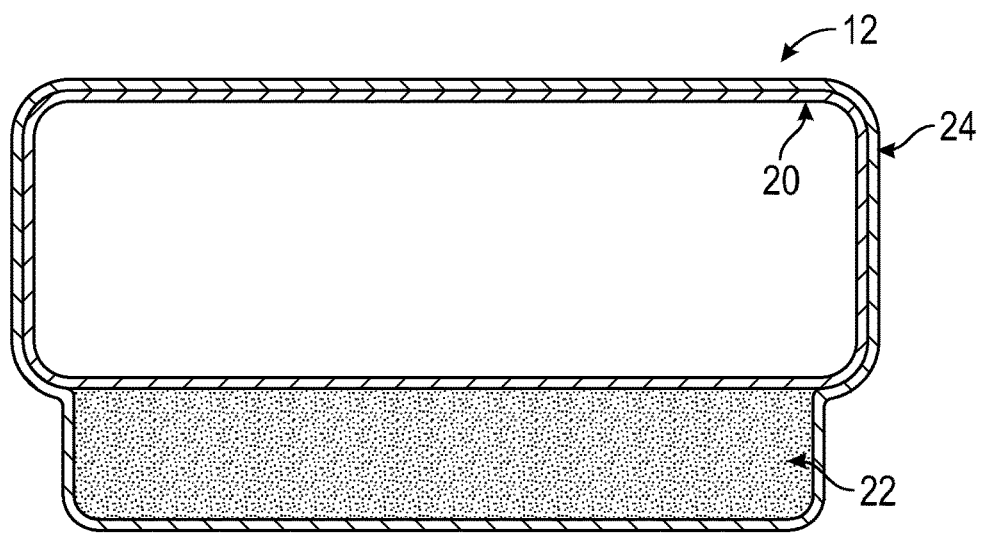
FIG. 6 illustrates a cross-sectional profile of an exemplary rock rail assembly.

The roll formed and co-extruded structure may then pass through a cooling stage 66, which may include a cooling bath 67. After cooling, a cutoff stage 68 may cut the rock rail assembly 12 to the desired longitudinal length. End caps may be used to cover the cut ends. The cutoff stage 68 may use a cut-off saw to make the desired cuts. As can be appreciated, manufacturing a rock rail assembly 12 having a longer longitudinal length can be accomplished through adjustments at the cutoff stage 68. Substantial machining changes are not required to provide rock rails having different lengths. An exemplary profile of the manufactured rock rail assembly 12 is illustrated in FIG. 6.

Figure 7:
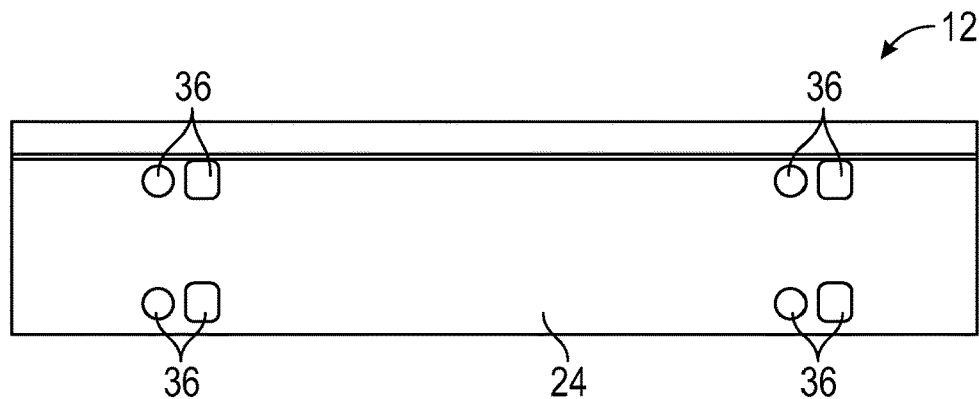
FIG. 7 illustrates a plurality of machined openings formed select portions of a rock rail assembly.

Finally, if desired, a machining stage 70 may machine the openings 36 through portions of the outer skin 24 and the beam structure 20. FIG. 7 shows some exemplary openings 36 that have been formed by the machining stage 70. The openings 36 may be used for mounting the rock rail assembly 12 to the structure 28.

The rock rail assemblies of this disclosure provide a novel hybrid metallic-polymeric design that is both tougher and more durable than prior designs. The proposed designs further provide point of contact load distribution across a larger surface area as the vehicle traverses over obstacles within a given terrain.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A rock rail assembly for a motor vehicle, comprising:
   a beam structure;
   an energy absorbing structure secured to the beam structure to establish a reinforced subassembly of the rock rail assembly; and
   an outer skin formed about the reinforced subassembly.

2. The rock rail assembly as recited in claim 1, wherein the energy absorbing structure is secured to a bottom surface of the beam structure.

3. The rock rail assembly as recited in claim 1, wherein the beam structure is a steel beam.

4. The rock rail assembly as recited in claim 3, wherein the steel beam includes a box-like structure and a weld seam.

5. The rock rail assembly as recited in claim 1, wherein the energy absorbing structure is comprised of a foamed polymer-based material.

6. The rock rail assembly as recited in claim 5, wherein the foamed polymer-based material includes a high density polyethylene (HDPE) that is modified by a foaming agent.

7. The rock rail assembly as recited in claim 6, wherein the foamed polymer-based material includes an adhesive resin.

8. The rock rail assembly as recited in claim 1, wherein the outer skin encapsulates the reinforced subassembly.

9. The rock rail assembly as recited in claim 1, wherein the outer skin is comprised of a polymer-based material.

10. The rock rail assembly as recited in claim 9, wherein the polymer-based material includes a high density polyethylene (HDPE).

11. The rock rail assembly as recited in claim 10, wherein the polymer-based material includes an adhesive resin.

12. The rock rail assembly as recited in claim 1, comprising at least one opening formed in the beam structure, wherein the at least one opening is configured for receiving a mechanical fastener.

13. A motor vehicle, comprising:
   a vehicle body structure; and
   a rock rail assembly mounted to the vehicle body structure,
   wherein the rock rail assembly includes a beam structure, an energy absorbing structure secured to the beam structure to establish a reinforced subassembly, and an outer skin formed around the reinforced subassembly.

14. The motor vehicle as recited in claim 13, wherein the beam structure is made of a metallic material, the energy absorbing structure is made of a foamed polymer-based material, and the outer skin is made of a polymer-based material.

15. The motor vehicle as recited in claim 14, wherein the foamed polymer-based material includes a high density polyethylene (HDPE) that is modified by a foaming agent.

16. The motor vehicle as recited in claim 14, wherein the metallic material includes steel.

17. The motor vehicle as recited in claim 14, wherein the polymer-based material includes a high density polyethylene (HDPE) that is modified by an adhesive resin.

18. The motor vehicle as recited in claim 13, wherein at least one opening is formed in the beam structure, and further wherein a mechanical fastener is received through the vehicle body structure and the at least one opening.

19. The motor vehicle as recited in claim 18, wherein the mechanical fastener attaches to a U-nut within an interior area of the beam structure.

20. A method for manufacturing a rock rail assembly for a motor vehicle, comprising:
   roll forming a beam structure;
   extruding an energy absorbing structure onto the beam structure to form a reinforced subassembly of the rock rail assembly; and
   extruding an outer skin about the reinforced subassembly.

* * * * *